(12) United States Patent
Lowry et al.

(10) Patent No.: US 7,707,690 B2
(45) Date of Patent: May 4, 2010

(54) BI-DIRECTIONALLY OPERATING HINGE ASSEMBLY

(75) Inventors: David A. Lowry, Wayne, PA (US); Mark Cooper, Norristown, PA (US); Eugene Novin, Ambler, PA (US)

(73) Assignee: Southco, Inc., Concordville, PA (US)

( * ) Notice: Subject to any disclaimer, the term of this patent is extended or adjusted under 35 U.S.C. 154(b) by 884 days.

(21) Appl. No.: 11/187,279

(22) Filed: Jul. 22, 2005

(65) Prior Publication Data

US 2006/0048338 A1 Mar. 9, 2006

Related U.S. Application Data

(60) Provisional application No. 60/590,716, filed on Jul. 23, 2004.

(51) Int. Cl.
*E05D 3/10* (2006.01)
(52) U.S. Cl. .............. 16/367; 16/282; 16/287; 16/288; 16/294; 16/302; 16/366
(58) Field of Classification Search ............ 16/221, 16/243, 250, 282, 285, 294, 302, 303, 327, 16/330, 338, 340, 352, 366, 367; 379/433.13; 455/575.3; 361/679, 681; 312/223.5; 345/169, 345/905; 248/917; 349/58, 65
See application file for complete search history.

(56) References Cited

U.S. PATENT DOCUMENTS

| | | | |
|---|---|---|---|
| 4,630,332 A | 12/1986 | Bisbing | |
| 4,630,333 A | 12/1986 | Vickers | |
| 5,412,842 A | 5/1995 | Riblett | |
| 5,564,163 A | 10/1996 | Lowry et al. | |
| 5,752,293 A | 5/1998 | Lowry et al. | |
| 5,765,263 A | 6/1998 | Bolinas et al. | |
| 5,915,441 A | 6/1999 | Schlack | |
| 6,141,831 A | 11/2000 | Novin et al. | |
| 6,178,598 B1 | 1/2001 | Creely, III et al. | |
| 6,182,330 B1 | 2/2001 | Novin et al. | |
| D439,130 S | 3/2001 | Ford et al. | |
| 6,347,433 B1 | 2/2002 | Novin et al. | |
| 6,658,272 B1 * | 12/2003 | Lenchik et al. | 455/575.1 |
| 6,839,576 B2 * | 1/2005 | Aagaard et al. | 455/575.1 |
| 6,845,546 B1 * | 1/2005 | Lu et al. | 16/367 |
| 6,871,384 B2 | 3/2005 | Novin et al. | |
| 6,883,206 B2 * | 4/2005 | Yang et al. | 16/337 |

(Continued)

FOREIGN PATENT DOCUMENTS

WO    WO 03/096558 A1 * 11/2003

*Primary Examiner*—Victor Batson
*Assistant Examiner*—Emily M Morgan
(74) *Attorney, Agent, or Firm*—Paul & Paul (57) ABSTRACT

A device has a closed position and at least first and second open positions. The device includes a base. A hinge assembly is engaged with the base. The hinge assembly has first and second axes. A hinged portion is engaged with the hinge assembly. The hinged portion is individually pivotable with respect to the base about each of the first and second axes of the hinge assembly. Pivoting of the hinged portion about the first axis moves the device between the closed position and at least the first open position. Relative pivoting of the hinged portion about the second axis moves the device between the closed position and at least the second open position.

28 Claims, 7 Drawing Sheets

U.S. PATENT DOCUMENTS

| | | |
|---|---|---|
| 6,941,617 B2 | 9/2005 | Pinto |
| 7,055,218 B2 * | 6/2006 | Lu et al. .................. 16/367 |
| 7,065,834 B2 | 6/2006 | Lowry |
| 7,096,540 B2 * | 8/2006 | Watanabe et al. ............ 16/367 |
| 7,168,135 B2 * | 1/2007 | Jung et al. .................. 16/367 |
| 2002/0167789 A1 | 11/2002 | Novin et al. |
| 2003/0040288 A1 * | 2/2003 | Kang et al. .................. 455/90 |
| 2004/0216275 A1 * | 11/2004 | Hayashi ..................... 16/303 |
| 2005/0188505 A1 | 9/2005 | Bennett |
| 2006/0005353 A1 * | 1/2006 | Kubota ...................... 16/221 |
| 2006/0048337 A1 | 3/2006 | Lowry et al. |
| 2006/0075603 A1 * | 4/2006 | Hsieh ......................... 16/330 |
| 2007/0037616 A1 * | 2/2007 | Hung ....................... 455/575.3 |

* cited by examiner

BI-DIRECTIONALLY OPERATING HINGE ASSEMBLY

CROSS-REFERENCE TO RELATED APPLICATIONS

This application claims the benefit of U.S. Provisional Patent Application No. 60/590,716, entitled "Bi-Directionally Operating Hinge", filed Jul. 23, 2004, which is incorporated herein by reference.

BACKGROUND OF THE INVENTION

This invention generally relates to hinges and, more particularly, to bi-directionally operating hinges for use in electronic devices, including wireless phones, personal digital assistants, notebook computers, and the like.

In certain hinge applications, it is desirable to provide a hinge which can maintain a hinged member in an open position or a closed position. When the hinged member is in the open position, in certain applications, such as clamshell-style phones and notebook computers, it is desirable that the hinged member be held stably in position. It is also desirable in such applications that the hinge maintain the hinged member in a closed position relative to the device housing for storage and transport. Generally in such applications, the open position is set at a fixed, predetermined angle.

One known, relatively inexpensive, preassembled, self-contained, two-position hinge can hold a hinged member in a first, open position or a second, closed position relative to a device housing without imparting an axial load on the hinged member or the device housing, thereby resulting in a longer operating life. The hinge uses a cam surface and a cam follower urged toward the cam surface by a spring to hold either a closed position or an opened position between 130 degrees and 160 degrees relative to the device housing. The hinge pivots the hinged member about a single axis. Although extensively used in clamshell-style phones, this type of hinge has limited usefulness in applications which prefer a different minimum amount of torque for closing a device than for opening a device.

In another known hinge, a higher torque is required to pivot a hinged member in one direction than is required to pivot the hinged member in the other direction. The hinge, primarily used in notebook computers, pivots the hinged member about a single axis.

It is desirable to provide a hinge that stably maintains a hinged member in opened and closed positions and requires a higher torque to pivot in one direction than the other direction, the hinge also providing for bi-directional opening of the hinged member.

BRIEF SUMMARY OF THE INVENTION

Briefly stated, the present invention is a device having a closed position and at least first and second open positions. The device comprises a base. A hinge assembly is engaged with the base. The hinge assembly has first and second axes. A hinged portion is engaged with the hinge assembly. The hinged portion is individually pivotable with respect to the base about each of the first and second axes of the hinge assembly. Pivoting of the hinged portion about the first axis moves the device between the closed position and at least the first open position. Relative pivoting of the hinged portion about the second axis moves the device between the closed position and at least the second open position.

In another aspect, the present invention is a bi-directionally operating hinge assembly comprising a main housing shaped to define first and second sides of the hinge assembly with first and second axes, respectively. The first and second axes are separated by an angle. First and second shafts are disposed along the first and second axes, respectively. First and second covers are engaged with the first and second shafts, respectively, to rotate about the first and second axes, respectively. First and second torque elements are engaged with the first and second shafts, respectively, and substantially rotationally fixed with respect to the first and second covers, respectively. The first and second torque elements impart a first frictional resistance to the corresponding shafts with rotation of the corresponding one of the first and second covers in a first direction and a second frictional resistance to the respective shafts with rotation of the corresponding one of the first and second covers in a second direction. An interlock is disposed between the first and second covers and inhibits rotation of the first and second covers at the same time.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the hinge assembly in accordance with the present invention and designated parts thereof. The terminology includes the words above specifically mentioned, derivatives thereof, and words of similar import.

Figure 1:
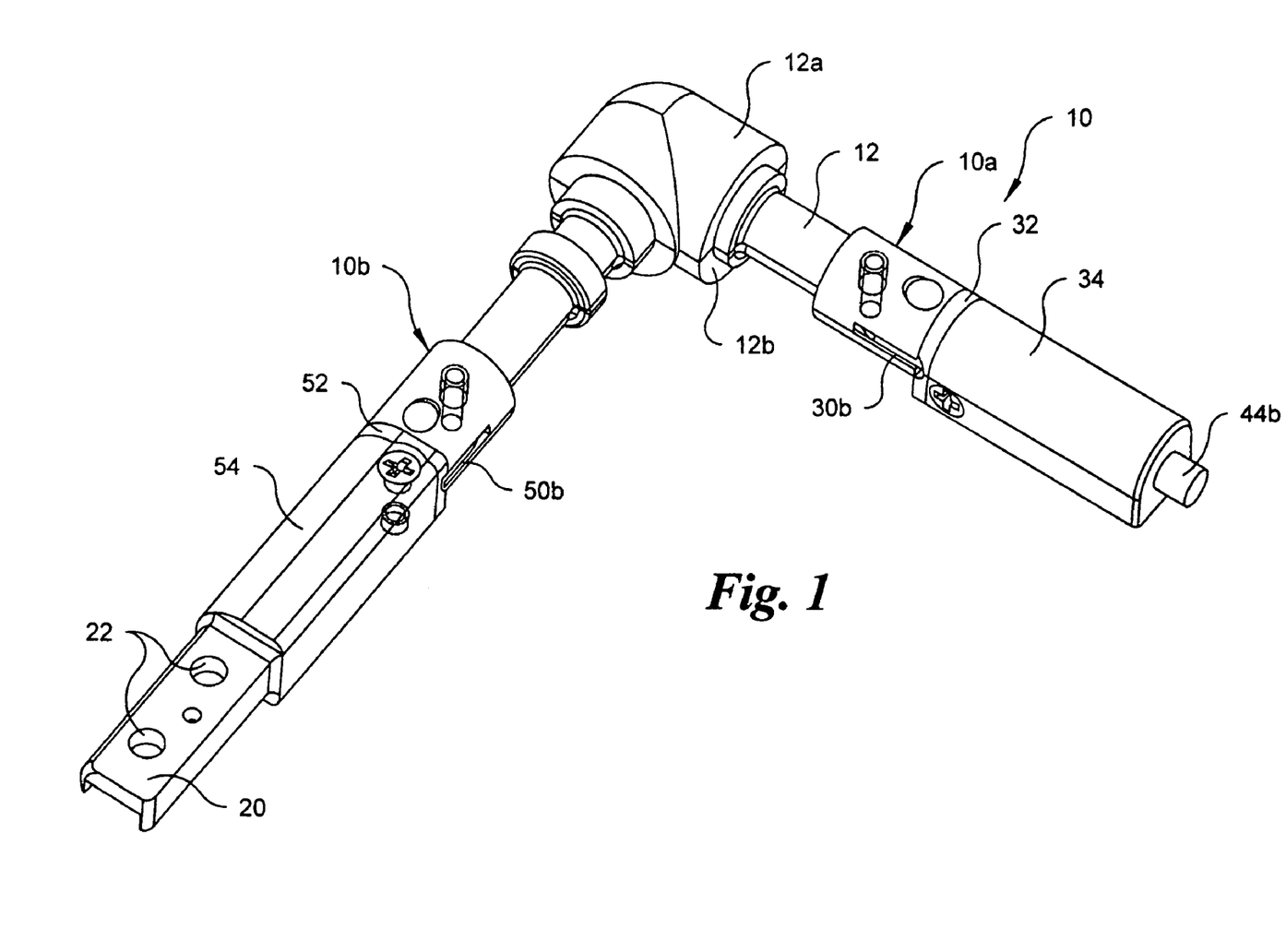
FIG. 1 is a top perspective view of a hinge assembly in accordance with a preferred embodiment of the present invention.

Referring to the drawings in detail, wherein like numerals indicate like elements throughout, there is shown in FIGS. 1-7 a preferred embodiment of a hinge assembly, indicated generally at 10, in accordance with the present invention. Referring to FIG. 1, the bi-directionally operating hinge assembly 10 can be seen fully assembled. Preferably, the hinge assembly 10 is generally L-shaped and has a first side 10a and a second side 10b. The first side 10a is preferably slightly shorter than the second side 10b, although this is not intended to be limiting, as it is within the spirit and scope of the present invention that the first side 10a be the same size as or larger than the second side 10b.

Figure 2:
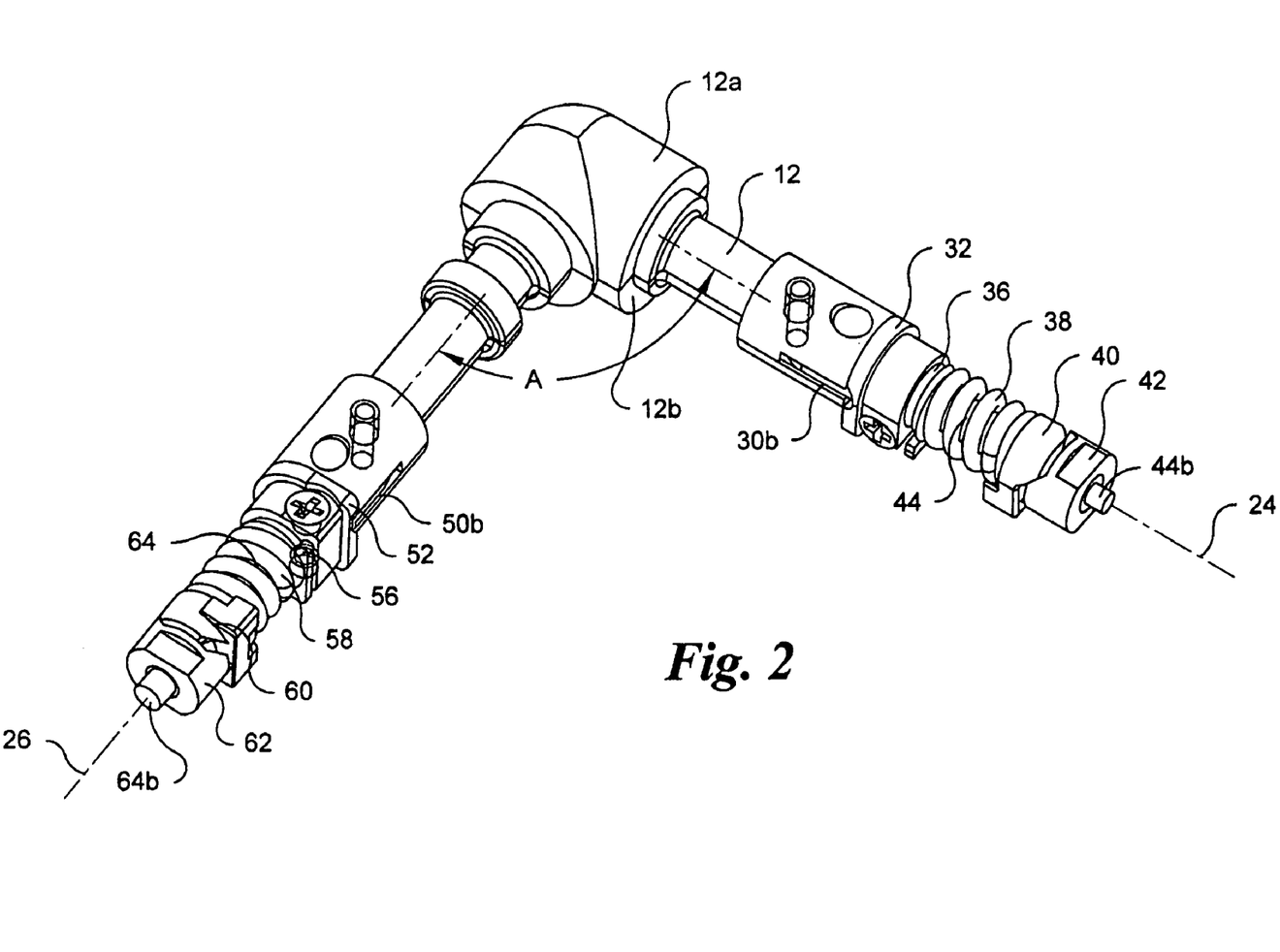
FIG. 2 is a top perspective view of the hinge assembly of FIG. 1 with spring covers and a bracket removed.

Referring now to FIGS. 1 and 2, the hinge assembly 10 has a main housing 12, which is preferably generally split down its center to form two halves, a top half 12a and a bottom half 12b. The main housing 12 is shaped to define the first and second sides 10a, 10b of the hinge assembly 10. The first and second sides 10a, 10b have corresponding first and second axes of rotation 24, 26. The first and second axes 24, 26 are separated by an angle A. Preferably, angle A is approximately ninety degrees, although this is not intended to be limiting. As such, it is within the spirit and scope of the present invention that the angle A could be any value provided the hinge assembly 10 is able to function as described herein. Covering the ends of the first side 10a and the second side 10b are first and second spring covers 34, 54, respectively. The first and second spring covers 34, 54 extend outwardly from proximate the ends of the main housing 12 and are attached to the hinge assembly 10 using screws, bolts, rivets, or other such attachment devices (not shown).

Preferably, the first and second spring covers 34, 54 are non-cylindrical in shape and preferably have at least one flattened side. The first and second spring covers 34, 54 can be inserted into complementarily-shaped holes (not shown) in an object, such as, but not limited to, an electronic device 70 (see FIG. 7) in order attach the hinge assembly 10 to the object and transfer torque from the object to the hinge assembly 10. Additionally, a bracket 20 with bracket apertures 22 is engaged to and extends outwardly from the second spring cover 54 for further attachment of the hinge assembly 10 to the object so as to inhibit the second spring cover 54 from slipping out of the corresponding hole in the object. Alternatively, the bracket 20 can be secured directly to a surface of the object without a corresponding hole therein by using screws, bolts, rivets, or the like. Although a bracket is not shown engaged with and extending from the first spring cover 34, it is within the spirit and scope of the present invention and is preferable to have a bracket engaged with the first spring cover 34 in order to further attach the first side 10a of the hinge assembly 10 to the object.

Figure 3:
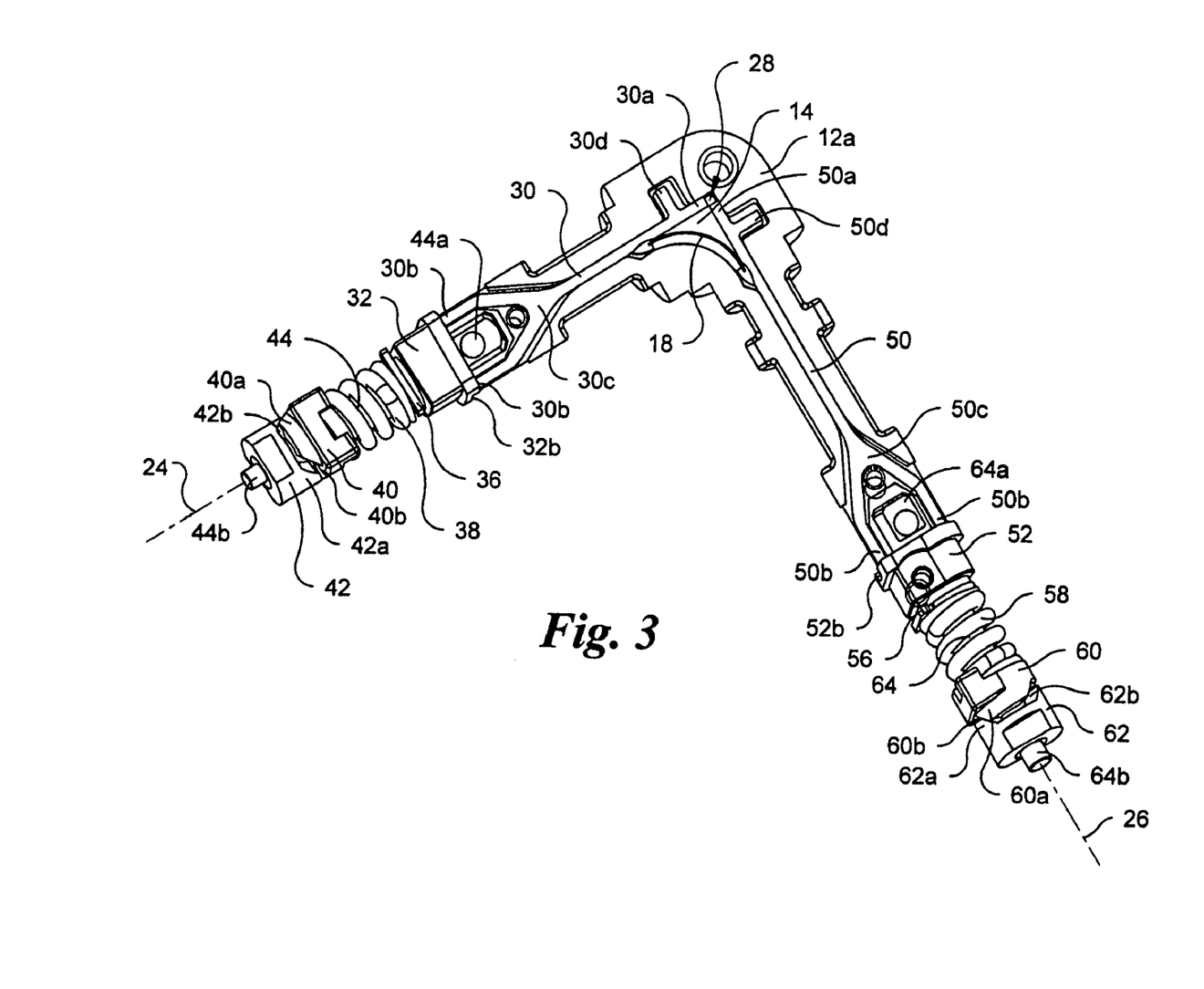
FIG. 3 is a bottom perspective view of the hinge assembly of FIG. 2 with a bottom half of a main housing removed.
Figure 4:
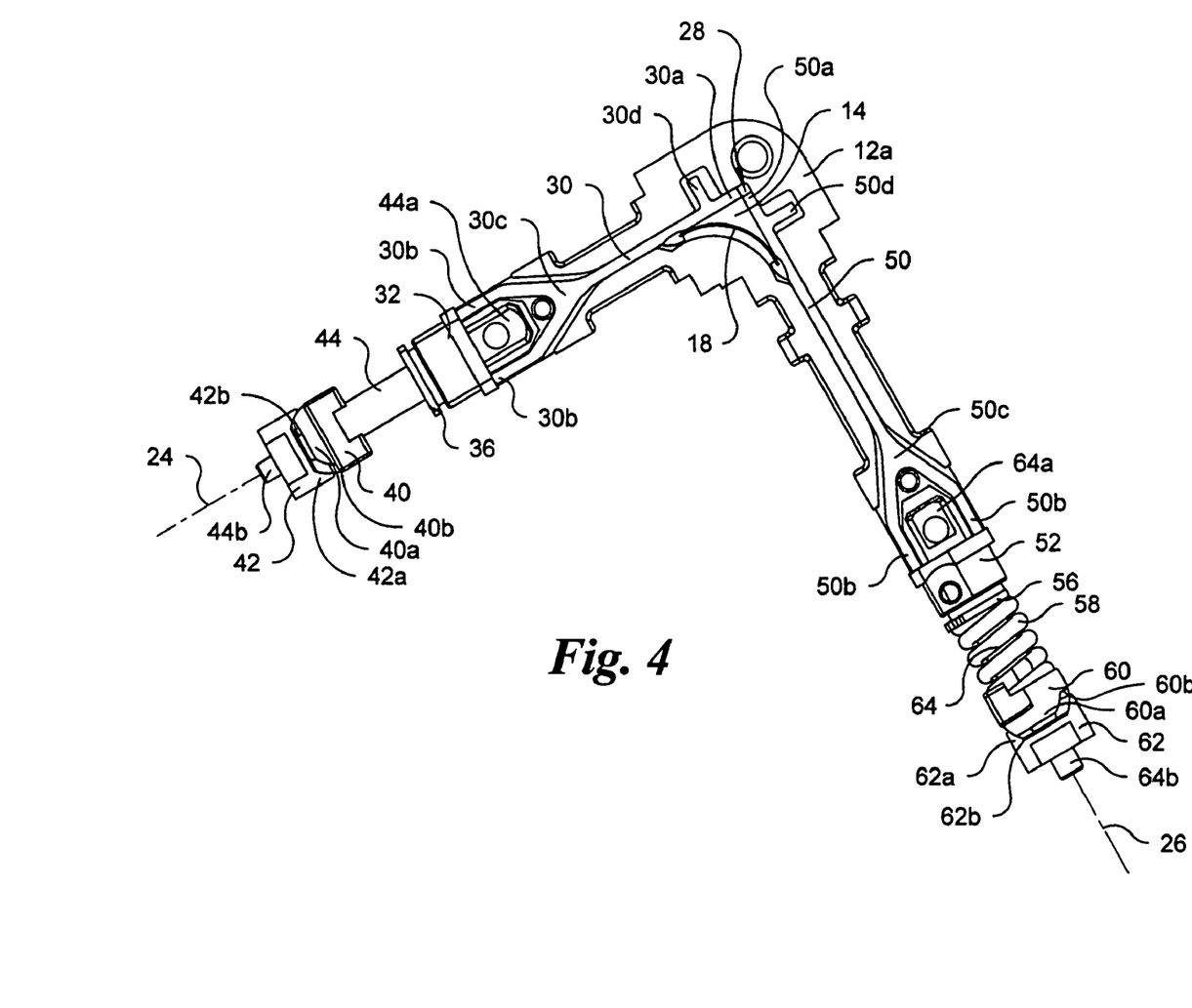
FIG. 4 is a bottom perspective view of the hinge assembly of FIG. 3 with a first spring removed.
Figure 5:
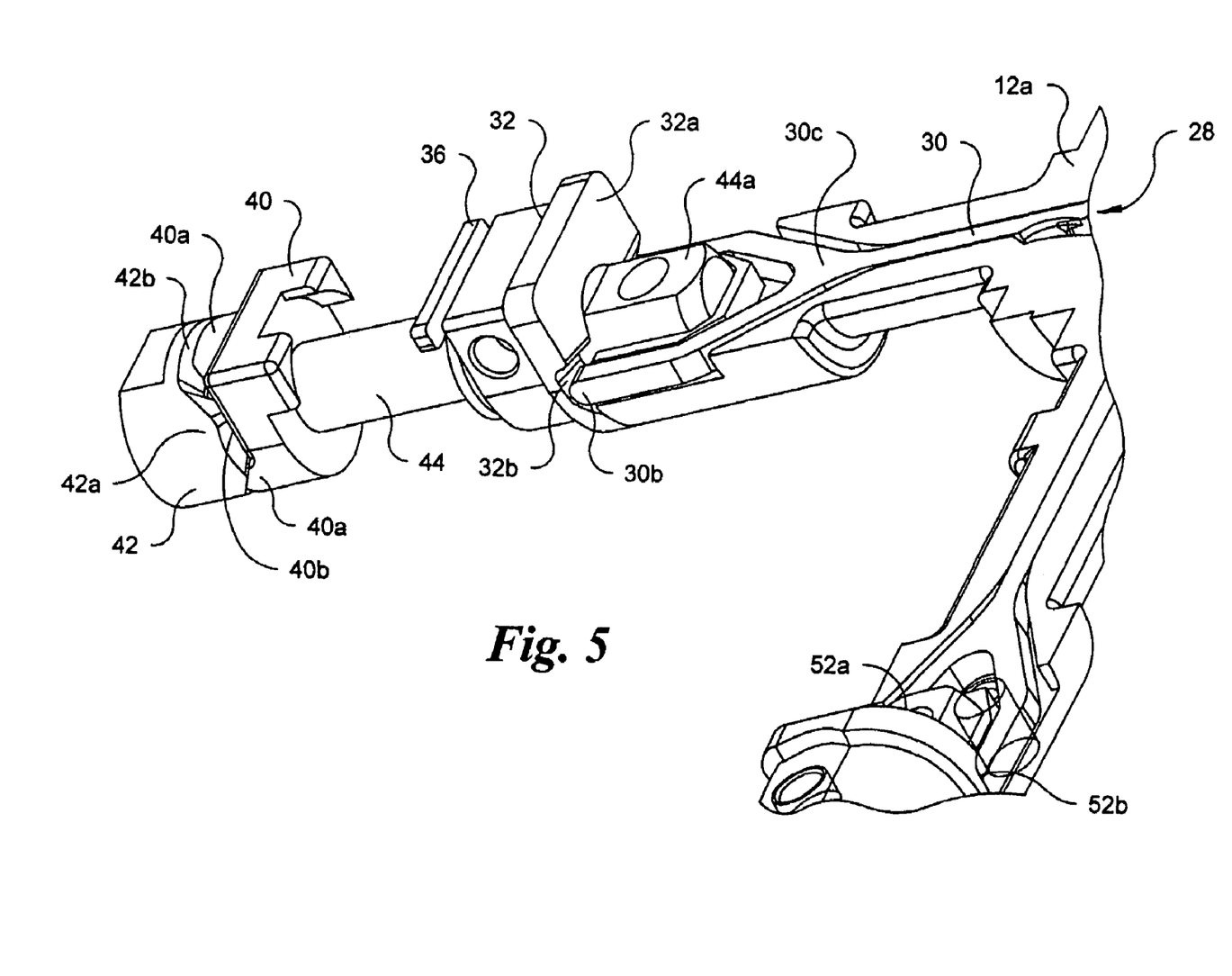
FIG. 5 is an enlarged bottom right perspective view of a first side of the hinge assembly of FIG. 4.

Referring to FIG. 2, the hinge assembly 10 can be seen with the first and second spring covers 34, 54 removed to expose the structures located thereunder. Referring also to FIGS. 3 and 4 wherein the bottom half 12b is also removed from the hinge assembly 10, the structures covered by the first and second spring covers 34, 54 are generally similar to one another. The first and second sides 10a, 10b of the hinge assembly 10 have first and second shafts 44, 64, respectively, attached at first ends 44a, 64a thereof to the ends of the main housing 12. The first ends 44a, 64a are preferably flattened on two diametrically opposed sides to provide for flush mounting to the main housing 12. The first ends 44a, 64a are inserted between the top half 12a and the bottom half 12b and are preferably riveted thereto to ensure that the first and second shafts 44, 64 do not rotate with respect to the housing 12. The first and second shafts 44, 64 extend outwardly from the main housing 12 along the first and second axes 24, 26, respectively. Preferably, the first and second spring covers 34, 54 are operatively engaged with and rotatable with respect to the first and second shafts 44, 64 so as to effectively rotate about the corresponding first and second axes 24, 26.

The first and second shafts 44, 64 extend through first and second locking members 32, 52, which are rotatable with respect to the first and second shafts 44, 64, respectively, and are located proximate the first ends 44a, 64a. The first and second spring covers 34, 54, when attached, engage with the first and second locking members 32, 52 and ensure that the first and second locking members 32, 52 are fixed with respect to the object to which the first and second spring covers 34, 54 are attached. Abutting the first and second locking members 32, 52 and also engaged with the first and second shafts 44, 64 are first and second torque elements 36, 56, which are substantially rotationally fixed with respect to the first and second spring covers 34, 54. Although described and portrayed with only one first torque element 36 and one second torque element 56, it is within the spirit and scope of the present invention that the hinge assembly 10 have more than one of each of the first and second torque elements 36, 56, provided the hinge assembly 10 is capable of performing in the manner described herein. The first and second torque elements 36, 56 will be described in greater detail below.

Abutting the first and second torque elements 36, 56 are first and second compression springs 38, 58. The first and second springs 38, 58 bias first and second sliding cam members 40, 60 outwardly from the ends of the main housing 12 along the first and second axes 24, 26, such that the first and second sliding cam members 40, 60 are slidable along at least portions of the corresponding first and second shafts 44, 64. The first and second sliding cam members 40, 60 are engaged within the corresponding first and second spring covers 34, 54 so as to slide but not rotate with respect to the first and second spring covers 34, 54 and the object to which the hinge assembly 10 is attached. The first and second sliding cam members 40, 60 have cam surfaces on sides opposite the sides abutted by the first and second springs 38, 58. The cam surfaces define at least one protrusion 40a, 60a and at least one depression 40b, 60b. However, it is preferable that the sliding cam members 40, 60 have two protrusions 40a, 60a and two depressions 40b, 60b.

Engaged with the first and second shafts 44, 64 proximate second ends 44b, 64b of the first and second shafts 44, 64 and abutting the cam surfaces of the first and second sliding cam members 40, 60 are first and second fixed cam members 42, 62. The first and second fixed cam members 42, 62 are fixed to or otherwise engaged with the first and second shafts 44, 64. Preferably, the first and second shafts 44, 64 include axially extending splined connections (not shown) to ensure that there is no rotation between the first and second fixed cam members 42, 62 and the first and second shafts 44, 64. The first and second fixed cam members 42, 62 have cam surfaces defining at least one protrusion 42a, 62a and at least one depression 42b, 62b. Preferably, the first and second fixed cam members 42, 62 have two protrusions 42a, 62a and two depressions 42b, 62b. The cam surfaces of the first and second fixed cam members 42, 62 abut and engage with the cam surfaces of the first and second sliding cam members 40, 60, due to the first and second compression springs 38, 58 which bias the first and second sliding cam members 40, 60 toward the corresponding first and second fixed cam members 42, 62.

The first and second fixed cam members 42, 62 preferably are maintained on the first and second shafts 44, 64 by flattening a portion of the second ends 44b, 64b of the first and second shafts 44, 64 to form flanges that abut the sides opposite the cam surfaces of the first and second fixed cam members 42, 62 to maintain the pivotable engagement of the first and second fixed cam members 42, 62 with the first and second sliding cam members 40, 60 and prevent the first and second fixed cam members 42, 62 from falling off of the first and second shafts 44, 64. Although flattening of the second ends 44b, 64b is the preferred method for maintaining the pivotable engagement of the first and second fixed cam members 42, 62 with the first and second sliding cam members 40, 60, it is within the spirit and scope of the present invention that the engagement be maintained in other ways, such as affixing a cap, cotter pin, or the like to the second ends 44b, 64b to abut the sides of the first and second fixed cam members 42, 62.

Referring to FIGS. 3-6, the hinge assembly 10 includes an interlock 28 disposed between the first and second spring covers 34, 54 and inhibiting rotation of the first and second spring covers 34, 54 with respect to the corresponding first and second shafts 44, 64 at the same time. The interlock 28 includes first and second rods 30, 50 which interact with one another with rotation of one of the first and second spring covers 34, 54 with respect to the corresponding first and second shafts 44, 64 to at least inhibit rotation of the other of the first and second spring covers 34, 54. Generally, the first and second rods 30, 50 of the interlock 28 are operatively engaged with and actuated by the first and second spring covers 34, 54, respectively, during relative rotation of the corresponding one of the first and second spring covers 34, 54, such that relative rotation of one of the first and second spring covers 34, 54 causes the corresponding one of the first and second rods 30, 50 to actuate and engage the other of the first and second rods 30, 50, at least inhibiting the other of the first and second rods 30, 50 from actuating in order to at least inhibit the other of the first and second spring covers 34, 54 from rotating relative the corresponding first and second shafts 34, 54.

Preferably, the top half 12a of the main housing 12 has a channel 14 in which the first and second rods 30, 50 are slidably retained. It is preferred that the first and second rods 30, 50 are slidably disposed along the corresponding first and second axes 24, 26. The first and second rods 30, 50 are preferably generally Y-shaped and have first ends 30a, 50a; forks 30c, 50c; and a pair of spaced second ends 30b, 50b. The first and second rods 30, 50 also have tabs 30d, 50d extending perpendicularly from the first and second rods 30, 50 proximate the first ends 30a, 50a. The tabs 30d, 50d limit the motion of the first and second rods 30, 50 along the first and second axes 24, 26 by abutting sides of a portion of the channel 14 at both ends of the range of motion of the first and second rods 30, 50. The first and second rods 30, 50 are thus slidable a short distance along the first and second axes 24, 26 and are biased outwardly (i.e. away from the main housing 12) with a leaf spring 18 engaged with the first and second rods 30, 50.

The interlock 28 preferably further includes the first and second locking members 32, 52, which are rotatable with the corresponding first and second spring covers 34, 54 and engaging the corresponding first and second rods 30, 50. It is preferred that the first and second locking members 32, 52 cause actuation of the corresponding first and second rods 30, 50, as is described hereafter.

Specifically, the second ends 30b, 50b preferably engage with cam surfaces on the first and second locking members 32, 52. The cam surfaces of the first and second locking members 32, 52 define two protrusions 32a, 52a and two depressions 32b, 52b. The first and second rods 30, 50 are located within the channel 14 such that the first ends 30a, 50a are proximate one another, the first and second rods 30, 50 being oriented generally at angle A (preferably at ninety degrees) to one another. By urging the first and second rods 30, 50 outwardly, the leaf spring 18 ensures that the second ends 30b, 50b of the first and second rods 30, 50 are in sliding, abutting engagement with the cam surfaces of the first and second locking members 32, 52, thereby biasing the first and second rods 30, 50 toward the corresponding first and second locking members 32, 52.

Figure 6:
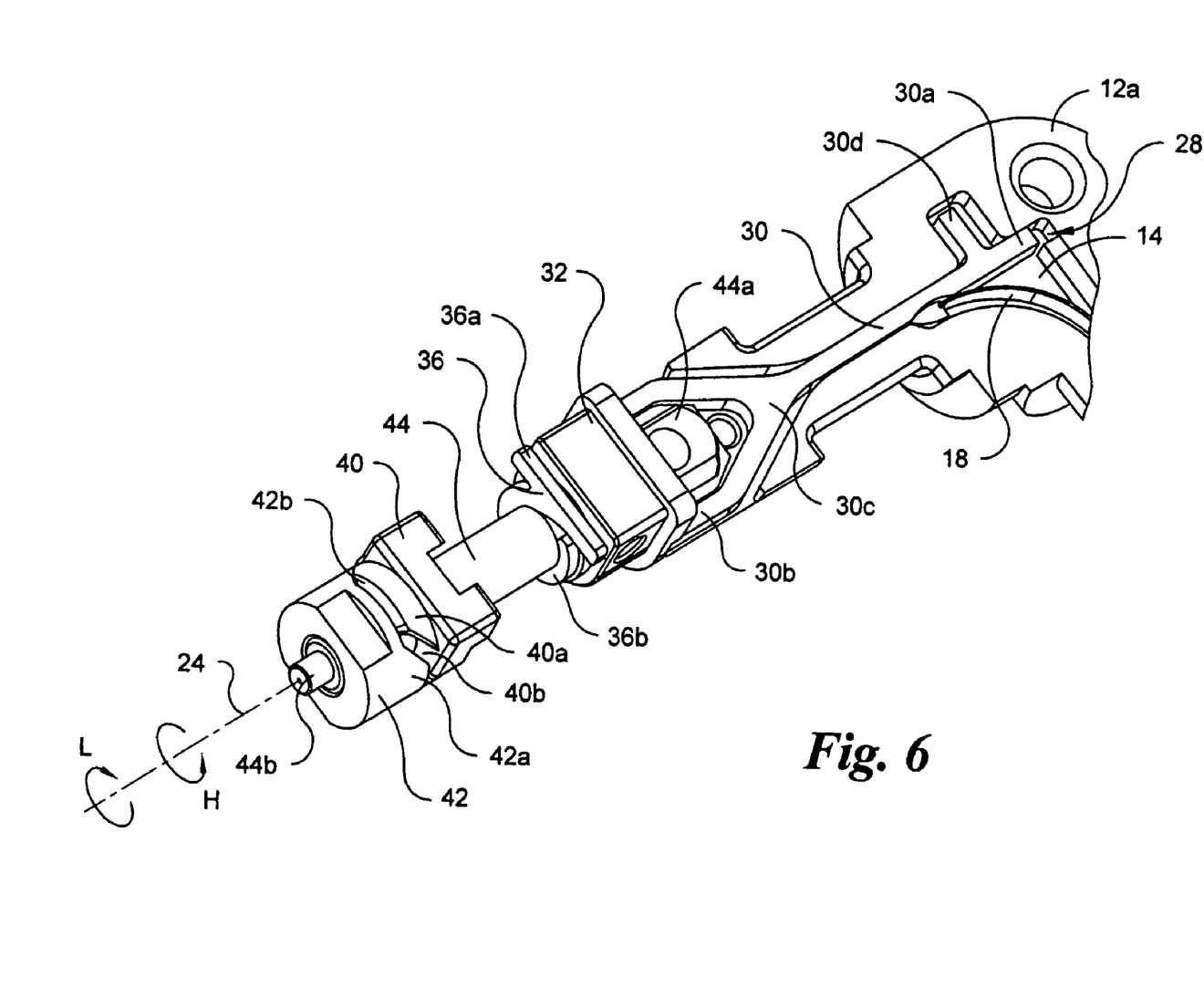
FIG. 6 is an enlarged bottom left perspective view of the first side of the hinge assembly of FIG. 4.

Referring now to FIG. 6, the first torque element 36 can be seen engaged with the first shaft 44 proximate the first locking member 32. Although the description below details the structure and operation of the first torque element 36, the structure and operation of the second torque element 56 is generally similar and can be inferred from the description below. The first torque element 36 is generally shaped like a lowercase letter "a" having a wrapped portion 36b that engages with, and, specifically wraps around the first shaft 44 with an interference fit and a at least one tab 36a that extends generally tangentially outwardly from a point at one end of the wrapped portion 36b. The tab 36a preferably extends in either tangential direction from the point of attachment with the wrapped portion 36b, although it is within the spirit and scope of the present invention that the tab 36a extend only in one tangential direction or that the tab 36a extend from the wrapped portion 36b in a direction other than tangential, provided the tab 36a is still capable of essentially rotationally fixing the first torque element 36 with the first spring cover 34, as is described herein. Preferably, the tab 36a is appropriately shaped and oriented such that it engages with the interior of the first spring cover 34 in order to essentially rotationally fix the first torque element 36 with the first spring cover 34. In this way, the first torque element 36 is not rotatable with respect to the first locking member 32 and the first sliding cam member 40, but is rotatable with respect to the first shaft 44 and the main housing 12.

The use of the first torque element 36 in the assembled hinge assembly 10 results in a greater amount of torque being required to rotate the first shaft 44 in one direction and a lesser amount of torque being required to rotate the first shaft 44 in the other direction. That is, the first torque element 36 imparts a first frictional resistance to the first shaft 44 with rotation of the first spring cover 34 in a first direction with respect to the first shaft 44 and a second frictional resistance to the first shaft 44 with rotation of the first spring cover 34 in a second direction with respect to the first shaft 44.

This result is necessitated by the geometry of the first torque element 36. Still referring to FIG. 6, the first torque element 36 is engaged with the first shaft 44, such that the first shaft 44 is rotatable with respect to the first torque elements 36. The first torque element 36 is preferably substantially rotationally fixed with respect to the first spring cover 34 due to engagement of the tab 36a with the interior of the first spring cover 34, as described above. An initial stress is created between the first shaft 44 and the first torque element 36 due to the interference fit therebetween. This initial stress creates frictional resistance that tends to inhibit rotation of the first shaft 44 within and with respect to the first torque element 36 in either direction.

Rotation of the first shaft 44 in a first, high-torque direction (denoted by arrow H in FIG. 6) with respect to the first torque element 36 results in the first torque element 36 imparting a first frictional resistance against the rotation of the first shaft 44 that is greater than that caused by the initial stress alone. This increased frictional resistance is caused because relative rotation of the first shaft 44 in the high-torque direction H corresponds to a wrapping direction of the wrapped portion 36b, which tends to increase the wrapping engagement of the first torque element 36 with the first shaft 44. In effect, additional stress is created between the first torque element 36 and the first shaft 44, which is added to the above-described initial stress. This additional stress creates greater surface pressure between the first shaft 44 and the first torque element 36 which increases the frictional resistance against the rotation of the first shaft 44. In this way, an increased amount of torque is required to overcome the frictional resistance in order to rotate the first shaft 44 in the high-torque direction H with respect to the first torque element 36.

Similarly, relative rotation of the first shaft 44 in a low-torque direction (denoted by arrow L in FIG. 6) results in the first torque element 36 imparting a second frictional resistance against the rotation of the first shaft 44 that is less than that caused by the initial stress alone. Essentially, relative rotation of the first shaft 44 in the low-torque direction L corresponds to an unwrapping direction of the wrapped portion 36b, which tends to decrease the wrapping engagement of the first torque element 36 with the first shaft 44. The stress between the first torque element 36 and the first shaft 44 is decreased, which is subtracted from the above-described initial stress. Decreased stress translates to decreased surface pressure between the first shaft 44 and the first torque element 36 which decreases the frictional resistance against the relative rotation of the first shaft 44. In this way, a decreased amount of torque is required to overcome the frictional resistance in order to rotate the first shaft 44 in the low-torque direction L with respect to the first torque element 36.

Referring to FIGS. 2-6, when the hinge assembly 10 is fully assembled, the first and second fixed cam members 42, 62 abut the first and second sliding cam members 40, 60 such that the protrusions 42a, 62a of the first and second fixed cam members 42, 62 correspond with the depressions 40b, 60b of the first and second sliding cam members 40, 60 and the protrusions 40a, 60a of the first and second sliding cam members 40, 60 correspond with the depressions 42b, 62b of the first and second fixed cam members 42, 62. Pivotable movement of the main housing 12 with respect to one of the first and second spring covers 34, 54 causes the surfaces of the first and second fixed cam members 42, 62 to ride along the surfaces of the first and second sliding cam members 40, 60, causing sliding motion of the first and second sliding cam members 40, 60 along the first and second axes 24, 26 from an outward position (corresponding to the protrusions 40a, 60a of the first and second sliding cam members 40, 60 within the depressions 42b, 62b of the first and second fixed cam members 42, 62) to an inward position (corresponding to the protrusions 40a, 60a of the first and second sliding cam members 40, 60 abutting the protrusions 42a, 62a of the first and second sliding cam members 42, 62). Outwardly biasing the first and second sliding cam members 40, 60 ensures that the first and second sliding cam members 40, 60 maintain an abutting relationship with the first and second fixed cam members 42, 62. This interaction of the first and second fixed cam members 42, 62 with the corresponding first and second sliding cam members 40, 60 at least assists in maintaining each of the first and second spring covers 34, 54 in at least first and second rotational positions with respect to the main housing 12.

Referring to FIGS. 3-6, the first and second rods 30, 50 inhibit, and preferably prevent, the hinge assembly 10 from rotating about both the first and second axes of rotation 24, 26 at the same time. This is accomplished by locking one axis of rotation 24, 26 while the hinge assembly 10 is being rotated about the other axis of rotation 26, 24. Rotation of the hinge assembly 10 about the first axis of rotation 24 causes rotation of the main housing 12 with respect to the first locking member 32. The second ends 30b of the outwardly biased first rod 30 slide from a position within the depressions 32b to a position abutting the protrusions 32a. In doing so, the first rod 30 is pushed inwardly along the first axis of rotation 24 such that the first end 30a is pushed between the first end 50a of the second rod 50 and the wall of the channel 14 to prevent subsequent inward motion of the second rod 50. Because the second rod 50 cannot be pushed inwardly, the main housing 12 cannot be rotated with respect to the second locking member 52 about the second axis of rotation 26, effectively locking the hinge assembly 10 from rotating about the second axis of rotation 26.

Figure 7:
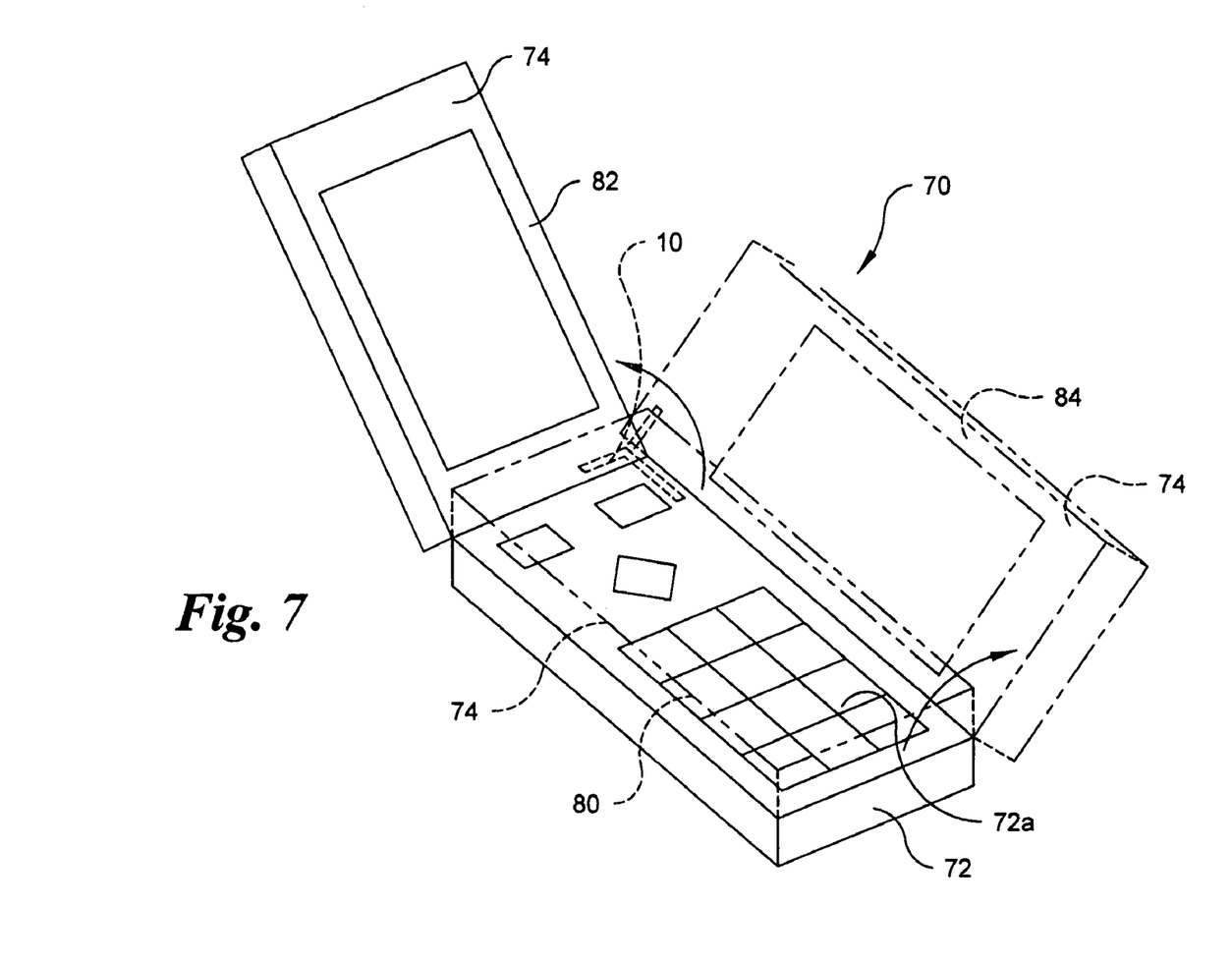
FIG. 7 is a front left perspective view of a device in which the hinge assembly of FIG. 1 can be used.

Referring specifically to FIG. 7, it is intended that the above-described hinge assembly 10 be used within a device, and preferably an electronic device, having multiple functions, such as, but not limited to a wireless phone/personal digital assistant (PDA) combination device 70. The device 70 preferably has a base 72 and a hinged portion, such as, but not limited to a display screen 74, pivotably connected to the base 72. The device 70 preferably has a closed position 80 and at least first and second open positions 82, 84. The hinge assembly 10 is preferably engaged with both the base 72 and the hinged portion or display screen 74 to allow the hinged portion or display screen 74 to be individually pivotable with respect to the base 72 about each of the first and second axes 24, 26 of the hinge assembly 10. Preferably, pivoting of the hinged portion or display screen 74 about the first axis 24 moves the device 70 between the closed position 80 and at least the first open position 82, and relative pivoting of the hinged portion or display screen 74 about the second axis 26 moves the device 70 between the closed position 80 and at least the second open position 84. Specifically, in this way, the bi-directional rotational capability of the hinge assembly 10 allows for the hinged display screen 74 to open along one axis of rotation 24, 26 to place the device 70 in the first open position 82, thereby selecting and using the device 70 in a first function, such as a wireless phone mode, and along the other axis of rotation 26, 24 to place the device 70 in the second open position 84, thereby selecting and operating the device 70 in a second function, such as a PDA mode. The base 72 of the device preferably includes a keypad 72a to allow a user to input information or otherwise use the device 70 in each of the functions thereof.

Although the use of the hinge assembly 10 in wireless phone/PDA combination devices is described above, it is not intended to be limiting. Therefore, it is within the spirit and scope of the present invention that the hinge assembly 10 be used in other applications, including other electronic device closures, automotive closures, furniture closures, and the like.

In operation, the hinge assembly 10 is located within a device, such as, but not limited to the wireless phone/personal digital assistant (PDA) combination device 70 (see FIG. 7), having a device housing or base 72 (see FIG. 7) and a hinged portion, such as, but not limited to the display screen 74 (see FIG. 7). One of the first and second sides 10a, 10b of the hinge assembly 10 is secured to the device housing and the other of the first and second sides 10a, 10b is secured to the hinged member. In this way, the hinged member is designed to open and close about either the first or the second axis of rotation 24, 26. When opened about the first axis of rotation 24, the hinged member is locked from also opening about the second axis of rotation 26, and vice versa. The first and second torque elements 36, 56 of the hinge assembly 10 allow for different required torque values for opening and closing of the hinged member. Also, the interaction between the first and second fixed cam members 42, 62 and the first and second sliding cam members 40, 60 necessitates a user to exert a greater amount of force while initially opening the device, during which point the protrusions 40a, 60a are riding up and out of the depressions 42b, 62b. When the device is opened, no additional force is required to maintain it in an open position, during which point the protrusions 40a, 60a are abutting the protrusions 42a, 62a. When closing the device, the user need only begin the closing motion of the hinged member, at which point the protrusions 40a, 60a of the first and second sliding cam members 40, 60 begin riding down into the depressions 42b, 62b of the first and second fixed cam members 42, 62 to effectively drive the hinged member closed.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention, as set forth in the appended claims.

We claim:

1. A device having a closed position and at least first and second open positions, the device comprising:
    a base;
    a hinge assembly engaged with the base, the hinge assembly having first and second axes;
    a hinged portion engaged with the hinge assembly, the hinged portion being individually pivotable with respect to the base about each of the first and second axes of the hinge assembly, wherein pivoting of the hinged portion with respect to the base about the first axis moves the device between the closed position and at least the first open position, and pivoting of the hinged portion with respect to the base about the second axis moves the device between the closed position and at least the second open position,
    wherein the hinge assembly further includes:
    a main housing shaped to define first and second sides of the hinge assembly with the first and second axes, respectively;
    first and second shafts disposed along the first and second axes, respectively;
    first and second covers operatively engaged with the first and second shafts, respectively, to rotate about the first and second axes, respectively, the first cover being fixed to the hinged portion and the second cover being fixed to the base;
    first and second torque elements engaged with the first and second shafts, respectively, and substantially rotationally fixed with respect to the first and second covers, respectively, the first and second torque elements applying a frictional resistance to the corresponding shafts with rotation of the corresponding one of the first and second covers; and
    an interlock disposed between the first and second covers, said interlock inhibiting pivotal movement of the hinged member relative to the base about the first axis and pivotal movement of the hinged member relative to the base about the second axis at the same time,
    wherein the interlock includes first and second rods which interact with one another with rotation of one of the first and second covers to at least inhibit rotation of the other of the first and second covers.

2. The device of claim 1, wherein the first and second axes are separated by an angle.

3. The device of claim 2, wherein the angle separating the first and second axes is approximately ninety degrees.

4. The device of claim 1, wherein the first and second rods of the interlock are operatively engaged with and actuated by the first and second covers, respectively, during rotation of the corresponding one of the first and second covers, such that rotation of one of the first and second covers causes the corresponding one of the first and second rods to actuate and engage the other of the first and second rods, at least inhibiting the other of the first and second rods from actuating in order to at least inhibit the other of the first and second covers from rotating.

5. The device of claim 4, wherein the first and second rods are slidably disposed along the corresponding first and second axes.

6. The device of claim 4, wherein the interlock further includes first and second locking members, respectively, rotatable with the corresponding first and second covers and engaging the corresponding first and second rods, the first and second locking members causing actuation of the corresponding first and second rods.

7. The device of claim 6, wherein the first and second rods are slidably disposed along the corresponding first and second axes, the first and second rods being biased toward the corresponding one of the first and second locking members by a leaf spring.

8. The device of claim 1, wherein each of the first and second torque elements includes a wrapped portion for engagement with the corresponding one of the first and second shafts and at least one tab extending from the wrapped portion to engage with the corresponding one of the first and second covers in order to rotationally fix each of the first and second torque elements with the corresponding first and second covers.

9. The device of claim 1, wherein the hinge assembly further includes: first and second sliding cam members slidable along at least portions of the corresponding first and second shafts; first and second fixed cam members fixed to the first and second shafts, respectively; and first and second springs biasing the first and second sliding cam members toward the corresponding first and second fixed cam members; wherein interaction of the fixed cam members with the sliding cam members assists in maintaining the hinged portion in the closed position and at least the first and second open positions.

10. The device of claim 1, wherein the device is an electronic device and the hinged portion is a display screen.

11. The device of claim 10, wherein the base includes a keypad.

12. The device of claim 11, wherein the electronic device has a first function with the display screen in the first open position and a second function with the display screen in the second open position.

13. The device of claim 12, wherein the first function is as a wireless telephone and the second function is as a personal digital assistant.

14. A bi-directionally operating hinge assembly, comprising:
    a main housing shaped to define first and second sides of the hinge assembly with first and second axes, respectively, the first and second axes being separated by an angle;
    first and second shafts disposed along the first and second axes, respectively;
    first and second covers operatively engaged with the first and second shafts, respectively, to rotate about the first and second axes, respectively;
    first and second torque elements engaged with the first and second shafts, respectively, and substantially rotationally fixed with respect to the first and second covers, respectively, the first and second torque elements imparting a first frictional resistance to the corresponding shafts with rotation of the corresponding one of the first and second covers in a first direction and a second frictional resistance to the respective shafts with rotation of the corresponding one of the first and second covers in a second direction; and
    an interlock disposed between the first and second covers, said interlock inhibiting rotation of the first cover relative to the first shaft about the first axis and rotation of the second cover relative to the second shaft about the second axis at the same time, wherein the interlock includes first and second rods which interact with one another with rotation of one of the first and second covers to at least inhibit rotation of the other of the first and second covers.

15. The bi-directionally operating hinge assembly of claim 14, wherein the first and second rods of the interlock are operatively engaged with and actuated by the first and second covers, respectively, during rotation of the corresponding one of the first and second covers, such that rotation of one of the first and second covers causes the corresponding one of the first and second rods to actuate and engage the other of the first and second rods, at least inhibiting the other of the first and second rods from actuating in order to at least inhibit the other of the first and second covers from rotating.

16. The bi-directionally operating hinge assembly of claim 15, wherein the first and second rods are slidably disposed along the corresponding first and second axes.

17. The bi-directionally operating hinge assembly of claim 15, wherein the interlock further includes first and second locking members, respectively, rotatable with the corresponding first and second covers and engaging the corresponding first and second rods, the first and second locking members causing actuation of the corresponding first and second rods.

18. The bi-directionally operating hinge assembly of claim 17, wherein the first and second rods are slidably disposed along the corresponding first and second axes, the first and second rods being biased toward the corresponding one of the first and second locking members by a leaf spring.

19. The bi-directionally operating hinge assembly of claim 14, wherein the angle separating the first and second axes is approximately ninety degrees.

20. The bi-directionally operating hinge assembly of claim 14, wherein each of the first and second torque elements includes a wrapped portion for engagement with the corresponding one of the first and second shafts and at least one tab extending from the wrapped portion to engage with the corresponding one of the first and second covers in order to rotationally fix each of the first and second torque elements with the corresponding first and second covers.

21. The bi-directionally operating hinge assembly of claim 14, further comprising: first and second sliding cam members slidable along at least portions of the corresponding first and second shafts; first and second fixed cam members fixed to the first and second shafts, respectively; and first and second springs biasing the first and second sliding cam members toward the corresponding first and second fixed cam members; wherein interaction of the fixed cam members with the sliding cam members assists in maintaining each of the first and second covers of the hinge assembly in at least first and second positions.

22. A bi-directionally operating hinge assembly, comprising:

a main housing shaped to define first and second sides of the hinge assembly with first and second axes, respectively, the first and second axes being separated by an angle;

first and second shafts disposed along the first and second axes, respectively;

first and second covers disposed along the first and second axes, respectively, for rotation about the first and second shafts, respectively, each of said first and second covers being adapted for attachment to one of a base and a hinged portion; and an interlock disposed between the first and second covers, said interlock inhibiting pivotal movement of the hinged member relative to the base about the first axis and pivotal movement of the hinged member relative to the base about the second axis at the same time when the base is attached to one of said first and second covers and the hinged member is attached to another of said first and second covers, wherein the interlock includes first and second rods which interact with one another with rotation of one of the first and second covers to at least inhibit rotation of the other of the first and second covers.

23. The bi-directionally operating hinge assembly of claim 22, further including:

first and second torque elements engaged with the first and second shafts, respectively, and substantially rotationally fixed with respect to the first and second covers, respectively, the first and second torque elements imparting a frictional resistance to the corresponding shafts with rotation of the corresponding one of the first and second covers.

24. The bi-directionally operating hinge assembly of claim 23, wherein said first and second torque elements impart a first frictional resistance to the corresponding shafts with rotation of the corresponding one of the first and second covers in a first direction and a second frictional resistance to the respective shafts with rotation of the corresponding one of the first and second covers in a second direction.

25. The bi-directionally operating hinge assembly of claim 22, wherein the first and second rods of the interlock are operatively engaged with and actuated by the first and second covers, respectively, during rotation of the corresponding one of the first and second covers, such that rotation of one of the first and second covers causes the corresponding one of the first and second rods to actuate and engage the other of the first and second rods, at least inhibiting the other of the first and second rods from actuating in order to at least inhibit the other of the first and second covers from rotating.

26. The bi-directionally operating hinge assembly of claim 23, wherein the first and second rods of the interlock are operatively engaged with and actuated by the first and second covers, respectively, during rotation of the corresponding one of the first and second covers, such that rotation of one of the first and second covers causes the corresponding one of the first and second rods to actuate and engage the other of the first and second rods, at least inhibiting the other of the first and second rods from actuating in order to at least inhibit the other of the first and second covers from rotating.

27. The device of claim 1, wherein said first and second torque elements impart a first frictional resistance to the corresponding shafts with rotation of the corresponding one of the first and second covers in a first direction and a second frictional resistance to the respective shafts with rotation of the corresponding one of the first and second covers in a second direction.

28. The device of claim 27, wherein the first and second rods of the interlock are operatively engaged with and actuated by the first and second covers, respectively, during rotation of the corresponding one of the first and second covers, such that rotation of one of the first and second covers causes the corresponding one of the first and second rods to actuate and engage the other of the first and second rods, at least inhibiting the other of the first and second rods from actuating in order to at least inhibit the other of the first and second covers from rotating.

* * * * *